March 20, 1962 E. J. CASSELMAN ET AL 3,025,747
METHOD AND APPARATUS FOR DETERMINING CUTTING
ABILITY OF AN EDGED METAL TOOL
Filed Feb. 1, 1956 9 Sheets-Sheet 1
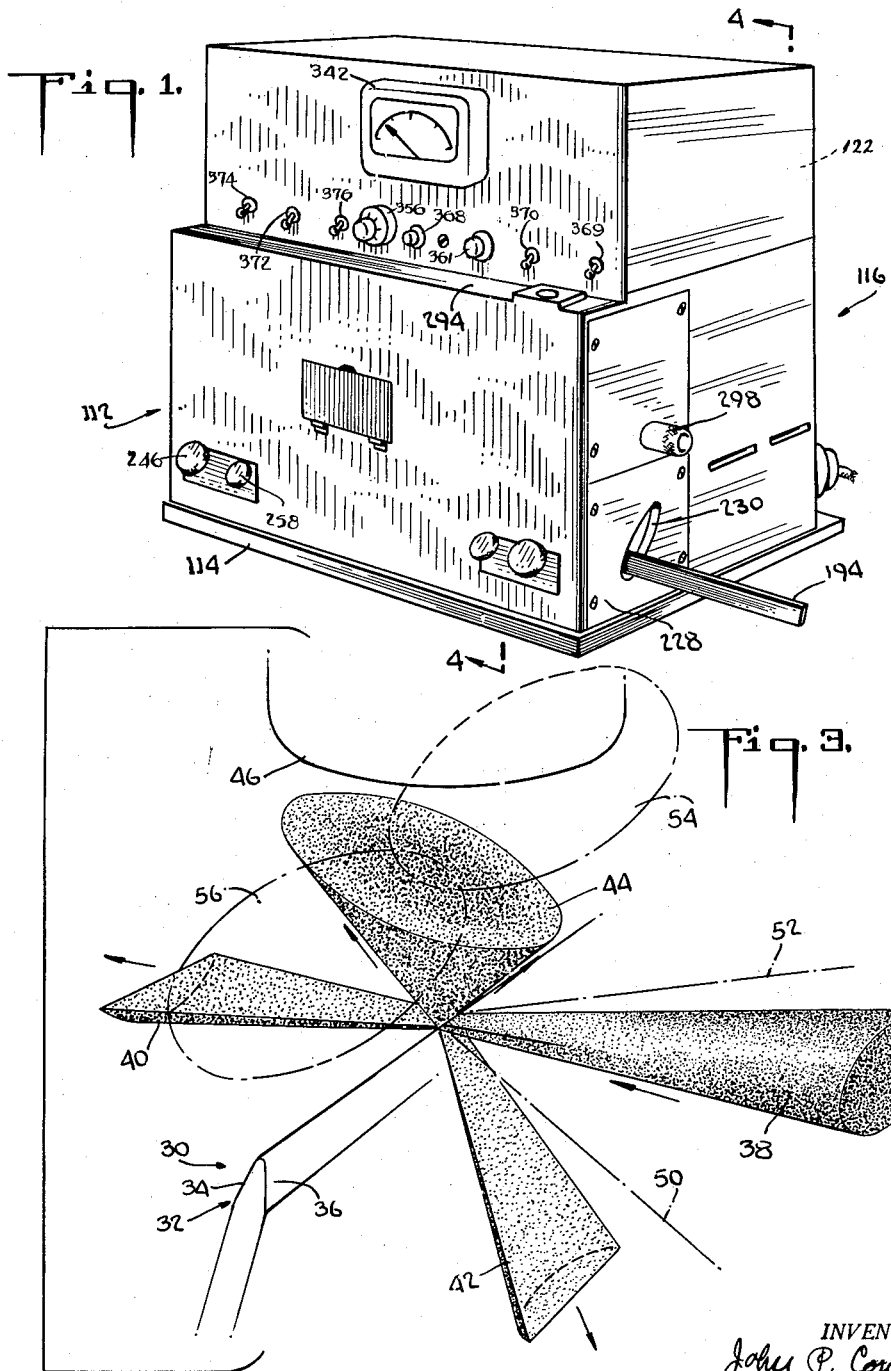
INVENTORS
John P. Conant
BY Elbridge J. Casselman
William S. Gluck
ATTORNEY

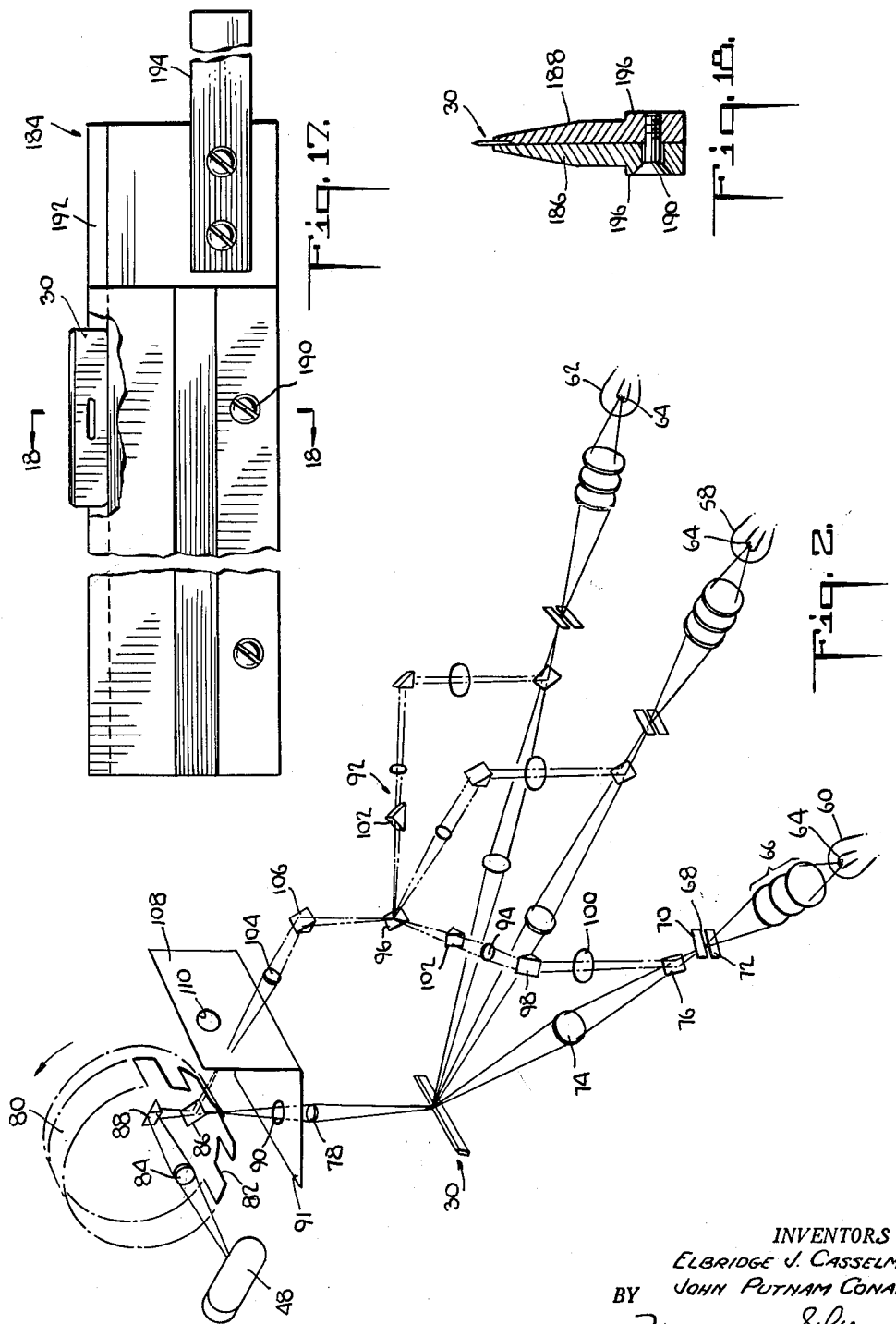

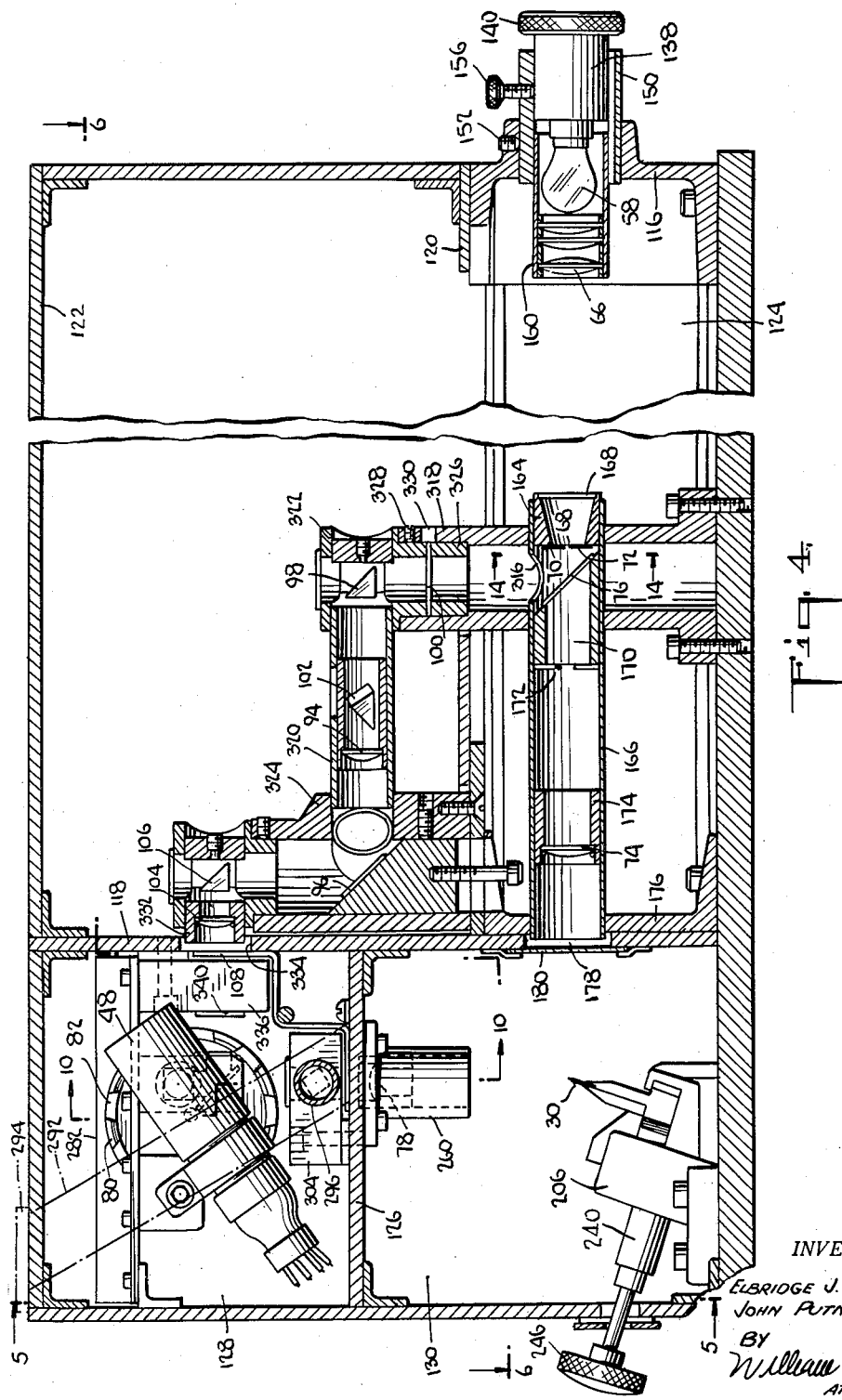

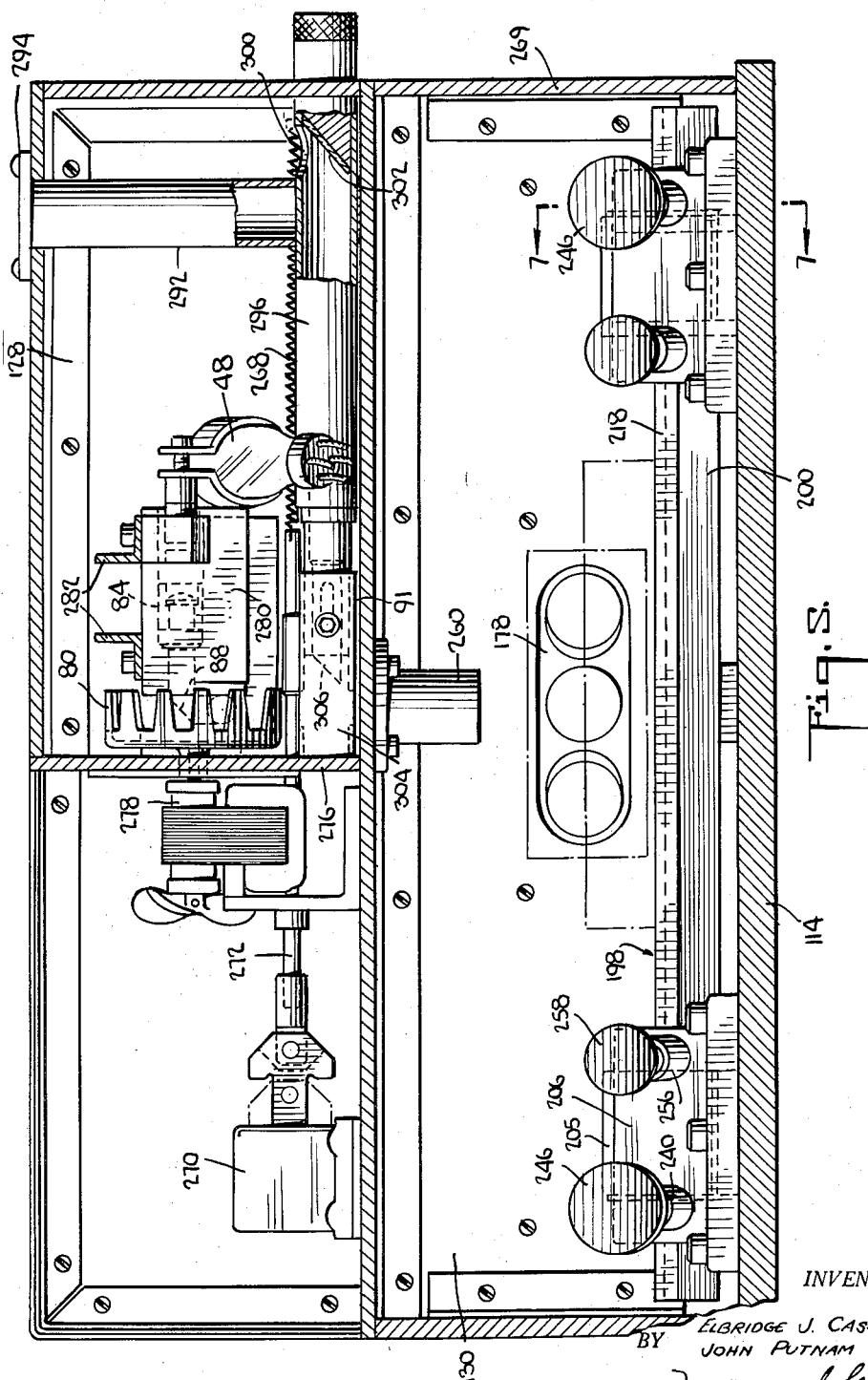

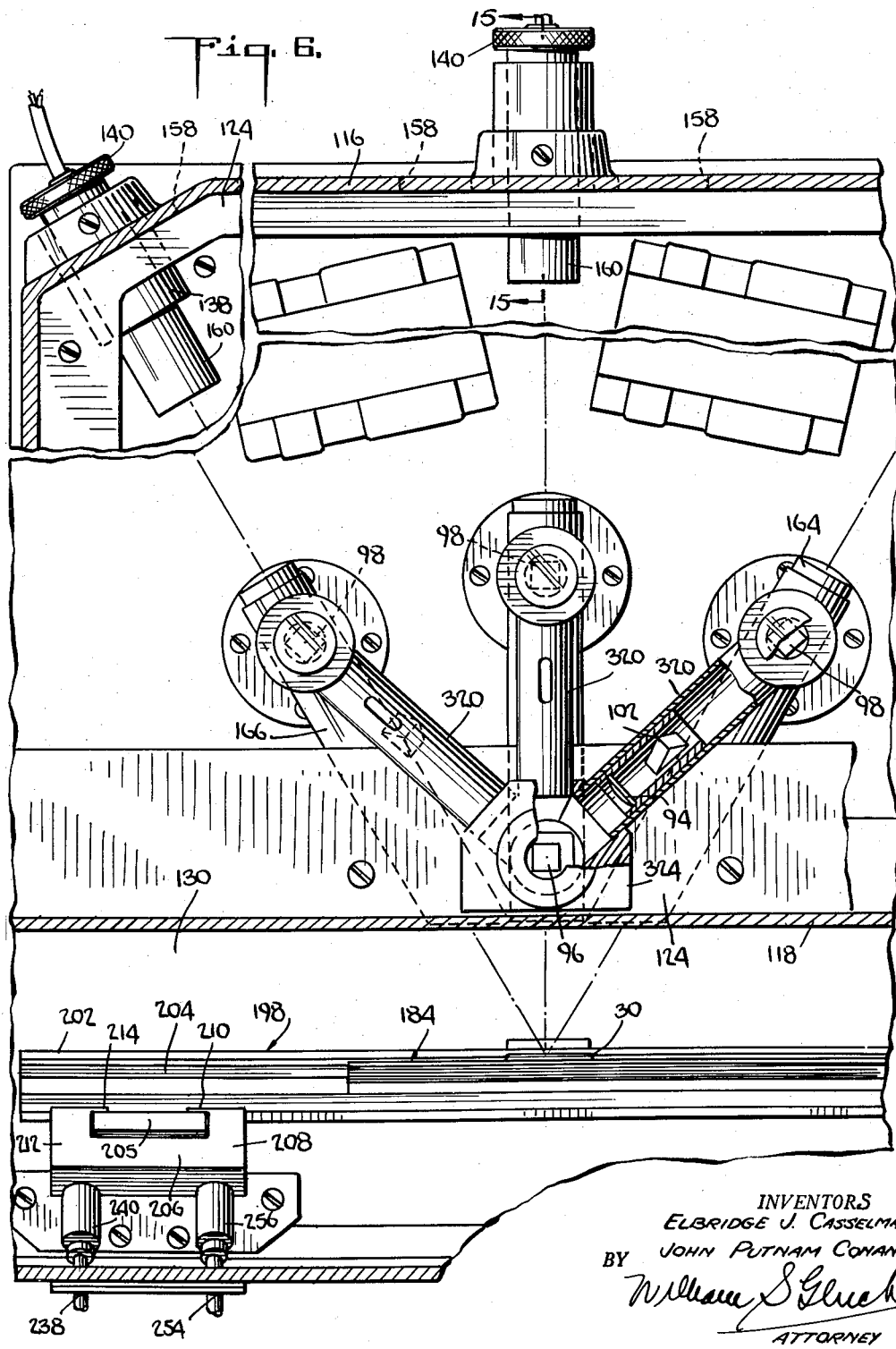

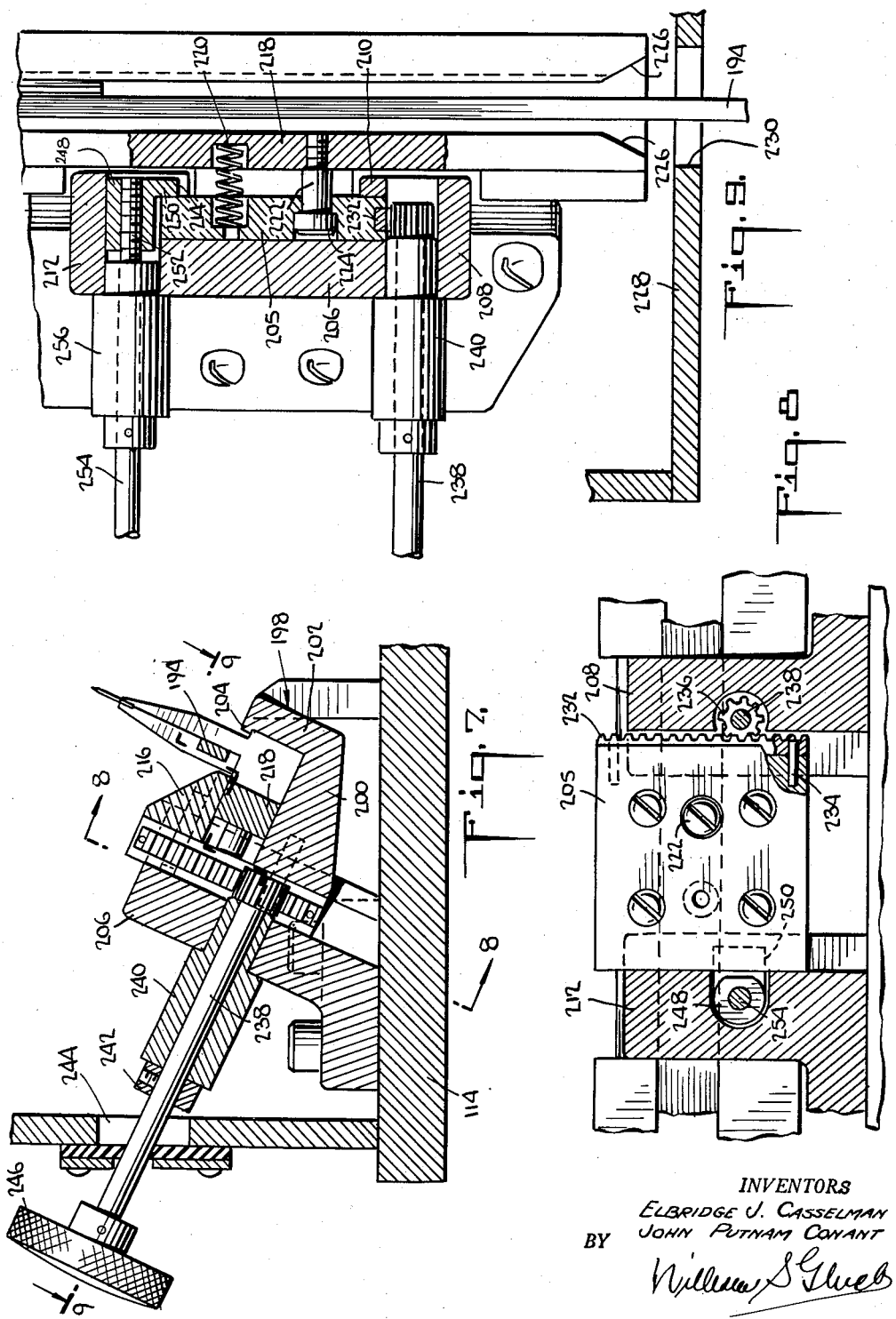

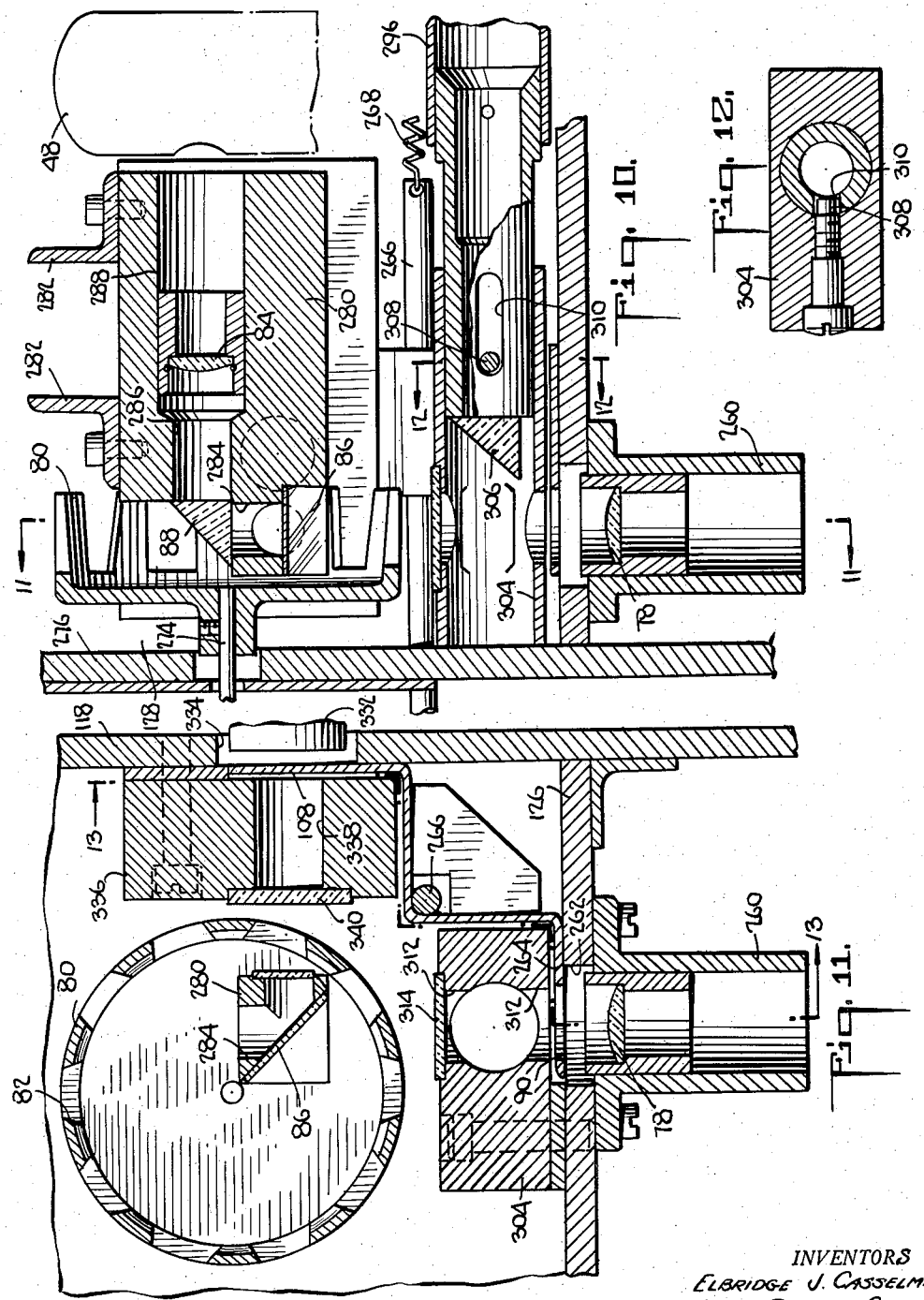

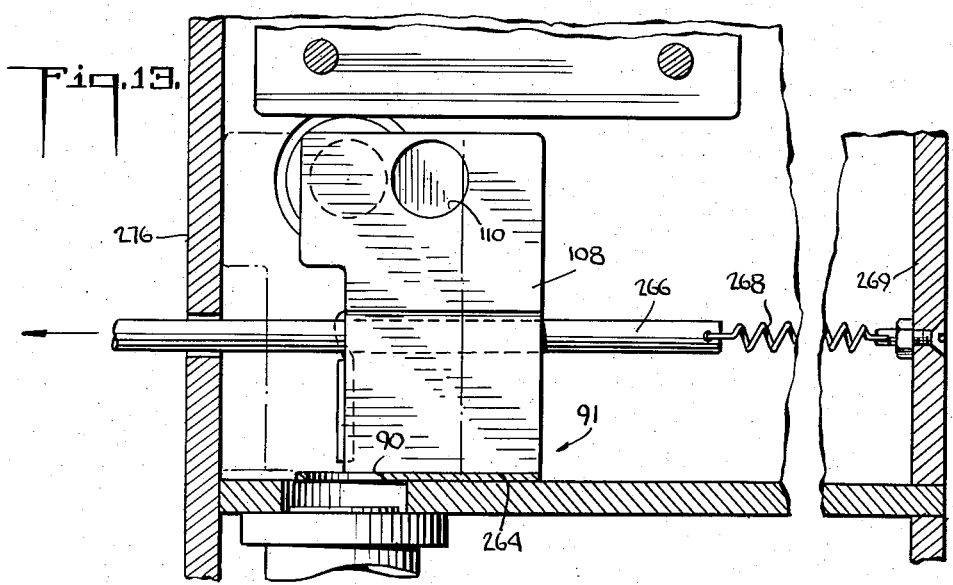
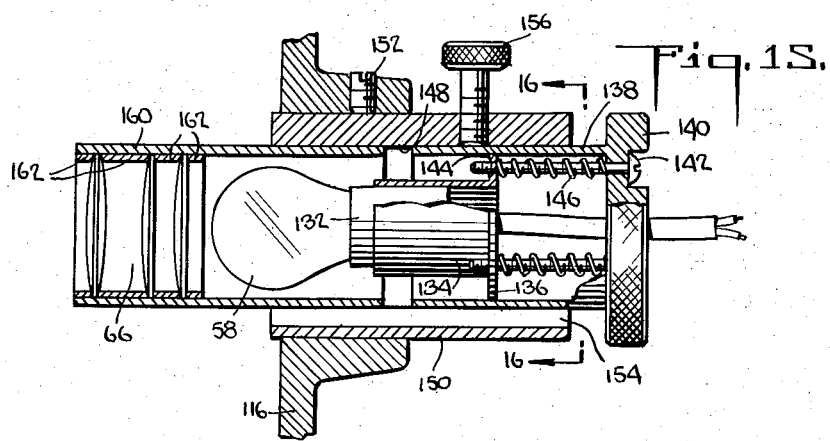

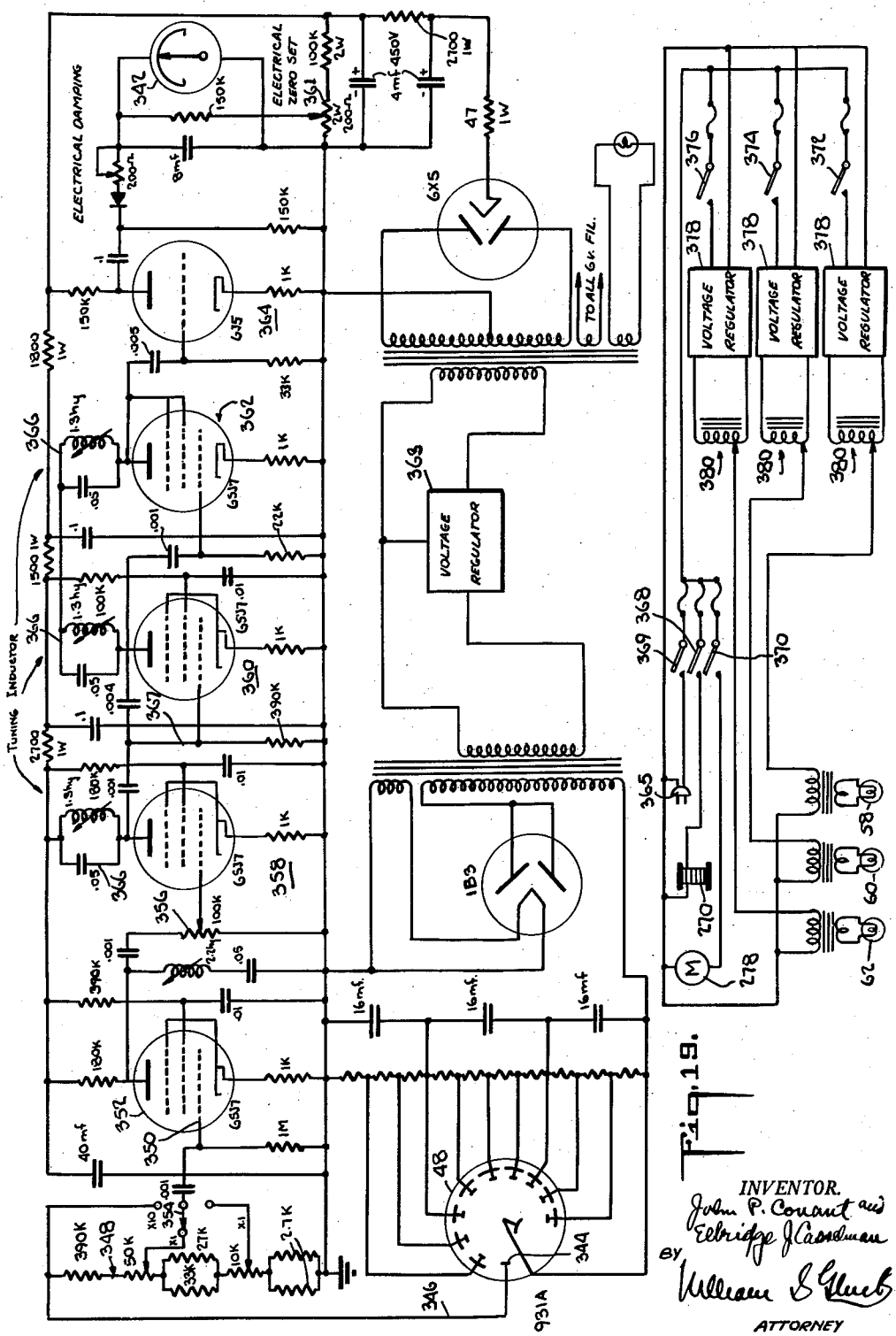

United States Patent Office 3,025,747
Patented Mar. 20, 1962

3,025,747
METHOD AND APPARATUS FOR DETERMINING CUTTING ABILITY OF AN EDGED METAL TOOL
Elbridge J. Casselman, Harrisonburg, Va., and John Putnam Conant, Beverly, Mass., assignors, by mesne assignments, to Philip Morris Incorporated, New York, N.Y., a corporation of Virginia
Filed Feb. 1, 1956, Ser. No. 562,748
20 Claims. (Cl. 88—14)

This invention relates to a method and apparatus for determining the cutting ability of an edged metal tool. More particularly, our invention pertains to a method and apparatus for gauging the two factors that principally determine the cutting ability of an edged tool, to wit, keenness, which is a measure of the ease of cutting, and irritation, laceration and/or mutilation of the object being cut, which are concomittant undesirable side effects and are a measure of the quality of cutting.

An edged tool, the field of use of which is such that the foregoing side effects are particularly objectionable, is a safety razor blade and, hence, the description of the invention will be related by way of example to measuring the cutting ability of such a tool. It will be understood, however, that there are many other edged tools the cutting ability of which is a subject of importance, for example, surgical knives, microtome knives, and wood shaving and scraping knives.

It is well known that safety razor blades, unless most carefully processed, tend to irritate the shaver's skin even though they are of extreme keenness when measured by conventional methods. Such blades seem to be subject to a deterioration of quality which causes them to finely scratch the skin during shaving. Indeed, this scratching may often be so severe as to redden the surface of the skin, and, if the user is not careful, to draw blood. The tendency is for poor safety razor blades to give a bad shave even if very keen because the user is reluctant to hold the blade against the skin as firmly as he should to cut the hair shafts close to the follicles.

It is believed that the difference between good and poor safety razor blades of the same apparent keenness resides in an unevenness or irregularity in the actual cutting edge, as well as irregularities, i.e. diversions from planarity, of the side faces of the blade immediately adjacent the cutting edge. Due to the foregoing, it is customary to gauge the cutting ability of safety razor blades by actual shaving test of the blades on the skin of human beings. If the tests are conducted with proper safeguards to avoid subjective reactions, a group of users can make a reasonably good determination of what might be referred to as the "effective keenness" of a blade, that is, its ability to cut hair without lacerating the skin. For lack of a better word this characteristic of an edged tool frequently will be referred to hereinafter as "shavability" instead of "cutting ability," it being understood that this term embraces the factor of keen cutting as well as the factor of quality of cutting, i.e., minimization of laceration and/or mutilation.

It is a principal object of our present invention to provide a method and apparatus for objectively gauging shavability without field or equivalent tests.

It is another object of our invention to provide a method and apparatus of the character described which aggregatively examine keenness and all the other factors that determine excellent cutting ability of an edged tool and lump the same to provide a numerable measure of shavability.

It is another object of our invention to provide a method and apparatus of the character described which are capable of uniformly measuring over a long period of time edged tools of a particular manufacture and of ascertaining by numerable measure whether the shavability of any particular tool is satisfactory regardless of variations in keenness or quality.

It is another object of our invention to provide a method and apparatus of the character described which are able to compare, as well as to determine, the shavability of edged tools formed by different methods of manufacture and thereby are able to provide a uniform standard of shavability for all types of edging processes.

It is another object of our invention to provide a method and apparatus of the character described which can make a quick determination of shavability and can present the measurement, if desired, as an electrical quantity so that the same can be used in sundry fashions, as for instance, to provide a meter reading or a warning signal.

It is another object of our invention to provide a method and apparatus of the character described which can quantitively determine the asymmetry of an edged tool.

Another object of our invention is to provide a method and apparatus of the character described which although extremely accurate and capable of measuring very tiny dimensions, nevertheless, can be operated by non-technical and, indeed, comparatively unskilled labor.

It is another object of our invention to provide a method and apparatus of the character described which will yield highly uniform and consistent measurements.

It is another object of our invention to provide a method and apparatus of the character described which are particularly simple to standardize so that despite movement of the apparatus, replacement or deterioration of parts, or variations of line voltage, the shavability measurement will not noticeably change.

It is another object of our invention to provide a method and apparatus of the character described which very rapidly and accurately will determine the shavability of successive edged tools.

It is another object of our invention to provide an apparatus of the character described having many novel features which enable the foregoing general objects to be accomplished. Thus, more specifically, it is an object of our invention to provide an apparatus which is so constructed that a substantially uniform scanning field is played on an edged tool for measurement purposes so that varying the position of the edge will not influence the shavability reading, that the source of energy for the scanning field can be oriented in space in order to secure the aforesaid substantially uniform field, that an unusually high degree of magnification is secured of the search field energy which impinges on the edged tool and is reflected to a collector whereby very fine dimensions and very fine changes in dimensions can be measured, that the high degree of magnification aforesaid is substantially linear so that simple scales and instruments can be utilized to observe or employ the measurement of shavability, that the edged tool optionally can be observed visually so that any gross defects in structure can readily be detected, that the apparatus can be changed rapidly from measuring shavability to calibration whereby the operator will not be deterred from constantly checking on the reliability of the measurement, that can hold an edged tool sturdily and yet finely adjust its position to a desired orientation for ascertaining shavability, and that minimizes and largely disregards stray energy near the edged tool being measured so that the sensitivity of the apparatus is high.

It is another object of our invention to provide an apparatus of the character described which is rugged, compact, comparatively light, and, withall, relatively simple and inexpensive to make.

It is another object of our invention to provide an apparatus of the character described which notwithstanding its delicacy of operation and complexity of structure constitutes comparatively few and simple parts.

Other objects of our invention in part will be obvious and in part will be pointed out hereinafter.

Our invention accordingly consists in the features of construction, combinations of elements, arrangements of parts and series of steps which will be exemplified in the machine and process hereinafter described, and of which the scope of application will be indicated in the appended claims.

In the accompanying drawings, in which is shown one of the various possible embodiments of our invention, FIG. 1 is a perspective view of an apparatus constructed in accordance with the instant invention;

FIG. 2 is a perspective schematic view of the optical system of said apparatus;

FIG. 3 is a highly enlarged perspective schematic view illustrating a typical distribution of the scanning field during measurement;

FIG. 4 is a fragmentary enlarged sectional view taken substantially along the line 4—4 of FIG. 1, the same constituting a vertical front-to-back sectional view of the machine;

FIG. 5 is a sectional view taken substantially along the line of 5—5 of FIG. 4, the same constituting front views of the interiors of the blade scanning and light measuring compartments;

FIG. 6 is a fragmentary sectional view taken substantially along the line 6—6 of FIG. 4, the same constituting top views of the interiors of the beam projecting and blade scanning compartments;

FIG. 7 is an enlarged sectional view taken substantially along the line 7—7 of FIG. 5, the same being illustrative of the details of construction of the adjusting mechanism for the blade holder track;

FIGS. 8 and 9 are sectional views taken substantially along the lines 8—8 and 9—9 of FIG. 7 and illustrating further details of said mechanism;

FIG. 10 is an enlarged sectional view taken substantially along the line 10—10 of FIG. 4 and shows in greater detail certain parts contained within the light measuring compartment;

FIGS. 11 and 12 are sectional views taken substantially along the lines 11—11 and 12—12 of FIG. 10 and illustrating further details of said parts;

FIG. 13 is an enlarged sectional view taken substantially along the line 13—13 of FIG. 11, the same being illustrative of the shutter employed to set the optical system for either calibration or gauging;

FIG. 14 is a sectional view taken substantially along the line 14—14 of FIG. 4, the same showing the slit used initially to shape a scanning beam;

FIG. 15 is an enlarged sectional view taken substantially along the line 15—15 of FIG. 6, the same being illustrative of the socket construction employed to orient the filament of a light bulb;

FIG. 16 is a sectional view taken substantially on the line 16—16 of FIG. 15;

FIG. 17 is a fragmentary front view of the blade holder;

FIG. 18 is a sectional view taken substantially along the line 18—18 of FIG. 17; and FIG. 19 is an electrical diagram of the circuit employed in said apparatus.

The detailed structural description of the apparatus can be more readily followed if the general principles on which the apparatus operates first are explained. These best may be understood by reference to FIGS. 2 and 3.

The edged tool being measured is shown as a standard safety razor blade 30. For convenience we have illustrated an injector type blade, that is to say, a blade having a single sharp edge 32 and a comparatively narrow stiff body that has no reenforcement along its back edge like a "Gem" type single edge blade. As is conventional the sharp edge has a pair of flanks 34, 36 forming a dihedral angle, the apex of which is the cutting edge of the blade.

It will be realized that, regardless of the accuracy and quality of grinding, honing, and stropping, it is impossible to form the dihedral apex as an absolutely sharp edge. Although to the naked eye and even under high power magnification, e.g. 500 ×, this edge may appear to be absolutely sharp, in fact, and as will be apparent under greater magnification, the edge is a curved surface of very small radius, the smaller the radius the greater being the keenness of the blade. To facilitate visualization of this shape, in FIG. 3 the curvature of the dihedral apex is grossly exaggerated.

It is known that the radius of curvature and, therefore, the keenness of the sharp edge, can be gauged by directing a beam of light upon the edge in a plane perpendicular to the length of said edge. The portion of the beam which strikes the curved dihedral apex is scattered in said plane, the degree of scattering being a function of the radius of curvature. The energy reflected from said apex in any particular direction in said plane is inversely proportional to the keenness of the edge. However, many factors (e.g. change in line voltage, drifting values of electrical components, replacement of parts, stray illumination, blade asymmetry and shifting of blade position) prevent a measurement of this energy from being reliable determination of keenness or even an approximate determination of shavability.

Furthermore it is not possible to make the dihedral apex straight and continuous, nor to make the flanks 34, 36 perfectly plane. Both of these deviations lessen the quality of cutting and hence the shavability of the blade because they induce irritation, laceration, etc., of the object to which the blade is being applied, i.e. the skin. However, if, in addition to playing a scanning beam on the apex of the blade in a plane perpendicular to said apex, auxiliary beams are played on the apex at angles to said plane, the spread of the reflected beams in a direction parallel to the sharp apex will be a function of the deviation of said edge from regularity, that is to say, of the deviation of the dihedral apex from straightness and of the deviation from planarity of the dihedral flanks immediately adjacent said apex.

Accordingly, referring in detail to FIG. 3, a horizontal beam 38 of light is thrown on the sharp edge 32. This beam lies in a plane perpendicular to the length of said edge, and as can readily be seen in said figure, is partially occluded by the edge. The beam is focused on the edge of the blade, the focused image being oblong in shape with a portion of the breadth of the image lying above said edge and a portion below. The long dimension of the image is parallel to said edge. Accordingly said beam 38 has approximately the spatial shape of a cone converging to a linear apex at the keen edge of the razor blade being tested. Since at the zone of convergence the beam is an oblong rather than a point, the pseudo cone has a slightly elongated cross section in a direction parallel to the cutting edge.

The portion 40 of the scanning beam which passes over the cutting edge of the razor blade fans out on the far side of the blade. Inasmuch as the scanning beam is focused on the blade and is not collimated, this portion 40 will have a section in a shape of a half moon with the plane side up and the convex side down.

The other principal portion of the scanning beam will strike the flank 36 of the keen edge facing in the general direction of impingement of the beam. The razor blade is held at such an angle to the incoming scanning beam, that is to say, with the flange 36 at such an angle to the longitudinal axis of the beam (18° is a suitable angle) that said portion of the beam intercepted by the flank is directed in a generally downward direction as indicated by the reference numeral 42. The downwardly reflected portion of the beam likewise constitutes a bundle of fanned out light rays. This relative positioning of the flank 36 of the razor blade and the incoming beam 38 is necessary in order to prevent the unwanted portion 42 from approaching the zone of measurement hereinafter to be described.

The part of the beam which strikes the actual cutting edge is diffused in a fan 44, the spread of which in the perpendicular plane of said beam, and hence the unit intensity at any given point, is a function of the radius of curvature of the cutting edge; the greater the radius of curvature, the less diffusion will take place and the higher the unit energization within the fan 33, and vice versa.

Located directly above the portion of the blade which the scanning beam strikes is the zone of measurement which constitutes the entrance end 46 of an optical measuring system that collects the rays of light entering its field of view and directs the same to a light sensitive element 48 (FIG. 2), such as a photo electric cell, e.g., a photo multiplier. It will be apparent that the electrical energy generated by the photo multiplier is inversely proportional to the keenness of that part of the cutting edge examined by the beam 38.

It should be noted that the quantity of light reflected upwardly toward the entrance end of the optical measuring system is quite small because of the keen edge of the blade has very tiny dimensions and intercepts only a minute fraction of the scanning beam, and even this small quantity of light is further dispersed by the fanning out effect of the curved cutting edge. Accordingly, the optical system must be able accurately to handle minute quantities of light, and the photo multiplier must be accurately responsive to changes in these quantities.

To measure the cutting quality of the razor blade, i.e. irregularities in the cutting edge, we employ one or more, preferably two, additional scanning beams, which are trained upon the same portion of the edge of the blade as the perpendicular beam 38, but approach it at angles other than 90° to said edge. Preferably where two beams are used, they are disposed symmetrically on opposite sides of the perpendicular beam 38, and all are located in a common horizontal plane. To avoid confusion the two angular side beams, 50, 52, have been schematically shown by dot-and-dash lines in FIG. 3, these lines representing the longitudinal axes of the beams.

Both side beams 50, 52, like the beam 38, are focused on the edge of the razor blade to form an oblong image thereat. Each of said beams, too, has a portion which travels over the edge of the blade to the far side of the measuring apparatus and a portion which is deflected downwardly away from the optical measuring system. However, because the angular beams approach the edge of the blade from the sides, those parts of the beams which strike the edge and are fanned out by the curvature of the edge form roughly conic shapes having elliptical sections in a horizontal plane parallel to the longitudinal axis of the blade. Due to the angular positions of the conic shapes said sections, which are denoted by the reference numerals 54 and 56, are elongated in a direction parallel to that of the cutting edge.

If the cutting edge were straight and regular, except for the curvature hereinbefore described, the elongation of the sections 54, 56 would not be sufficient for any of the reflected light energy from the side beams to reach the entrance end 46 of the optical measuring system. The angles at which the beams 50, 52 are directed preferably are chosen to prevent light from reaching said system under such circumstances. Thus, by way of example we have found that particularly good results are secured where the angle between the longitudinal axis of each of the beams 50, 52 and that of the beam 38, is about 30° when the entrance end 46 is close to the sharp edge. Nevertheless, it should be mentioned that other angles also yield usable results. For example, where the angle is less than 30°, some light from a regular edge may strike the optical measuring system, and this then must be discounted, e.g., neutralized as by shifting the zero point of a measuring meter. However, the sensitivity of the instrument measurements secured by the angular lighting is thereby lessened.

Irregularities in the edge tend further to scatter the rays of the angular scanning beams diffused by the cutting edge, increasing in a direction parallel to said edge the divergence of the light rays reflected from the cutting edge so that rays of light which strike the edge at an angle and thereafter are reflected back into the optical measuring system are caused to do so by blade irregularities which lessen cutting quality. Where the angle of side lighting is greater than 30°, the instrument becomes even more sensitive to deviations in the quality of the cutting edge. However, in such event the quantity of light reflected from the angular beams back into the optical measuring system becomes even smaller and raises further difficulties with respect to measuring and amplification, and it is for this reason that in the preferred form of our invention the angular beams are at about 30° to the perpendicular beam.

It now will be appreciated that the total light energy collected by the optical measuring system is a function of both keenness and cutting quality, said system acting to totalize measurements of both factors.

The entire optical system of the measuring apparatus is shown in FIG. 2. As there will be seen, we provide three electric bulbs 58, 60 and 62, each having a helical incandescent filament 64. A tri-element lens system 66 is associated with each bulb 58, 60 and 62, to focus the light forwardly emanating therefrom on a slit 68, defined by a pair of opaque plates 70, 72. There are three such slits, one for each one of the different bulbs. The slits are horizontal and all of them preferably lie in a common horizontal plane.

A second optical system, consisting of a single lens 74 for each bulb, has its object plane at the associated slit 72 and its focal plane at the edge of the blade 30. Hence this second system focuses on the blade edge the image of the incendescent filament at the slit, thereby forming a rectangular illuminated image at the edge of the razor blade. It will be observed that the second optical system includes on its optical axis a beam splitter 76, the purpose whereof soon will be apparent. Thus we have provided energy sources for casting three convergent beams trained upon the same portion of the cutting edge of the razor blade.

For collecting and measuring the light reflected upwardly from the edge of the razor blade, we employ a single optical system the forward element of which consists of a lens 78 having a horizontal object plane at the edge of the razor blade where the three beams of scanning light converge. The lens 78 focuses on the circumference of a tube 80, comprising a drum mounted to rotate about a horizontal axis and having plurality of slots 82 formed in its cylindrical surface in a position to intercept the optical axis of the lens 78.

The optical measuring system further includes a second lens 84 having as its object plane the focal plane of the lens 78 that is tangent to the cylindrical surface of the drum 80. The optical axes of the lenses 78, 84 are coincident at the surface of the drum. The vertical optical axis of the lens 84 passes through a beam splitter 86 and is directed horizontally out of the open end of the drum by a reflecting prism 88. The focal plane of the lens 84 is shown at the photo sensitive surface of the photo multiplier 48; however it is preferred to have the image of the edge slightly defocused at said surface.

It will be noted that the optical measuring system, and particularly the portion thereof including the first lens 78, and extending between the cutting edge of the razor blade and the circumference of the drum 80, passes through an opening 90 in the horizontal leg of an angular shutter 91. The shutter is transversely shiftable so that the aforesaid described measuring system only is operable as long as the opening 90 is in registration with the vertical optical axis of the lens 78.

The apparatus also has a calibration section 92. Said section includes the beam splitters 76 which direct upwardly a part of the light energy from the slits 68. A lens 94 associated with each bulb has its object plane at the related slit 68 and focuses on a ceramic reference disc 96. The light entering each lens 94 is directed horizontally from the beam splitter by a reflecting prism 98. Said ceramic reference disc lies at an angle of 45° to the horizontal and is struck at a common area by each of the three beams emanating from the bulbs 58, 60, 62. The calibration section of each of the three beams includes a rotatable polarizing disc 100 which is employed, as soon will be seen, for adjustment purposes.

Due to the fact that the slit image beams associated with the two side bulbs 60, 62 are slanted inwardly by the prisms 98 to converge on the reference disc 96 and the slit image beam associated with the central bulb 58 is not so slanted, the outer reflecting prisms 98 rotate the associated beams about their optical axes while the central beam is not affected whereby the three slit images focused on the reference disc 96 will not be coincident. Indeed the images of the outer slits will intersect one another and thereby affect calibration of the instrument. In order to overcome this drawback and superimpose the images of the slits on the reference disc 96, we employ beam rotating Dove prisms 102 in association with the outer beams.

A lens 104 has its object plane at the reference disc 96 where the three calibration beams converge, said lens viewing the surface by reflection through a prism 106. Light emerging from the lens 104 is focused on the periphery of the drum 80, being trained on the beam splitter 86 so that when the calibration section is operable the light from the lens 104 will be picked up by the lens 84 and directed on the photo sensitive surface of the photo multiplier 48.

The vertical leg 108 of the angular shutter 91 contains an opening 110 that is aligned with the optical axis of the lens 104 when the apparatus is set up for calibration.

It thus will be seen that simply by shifting the shutter 91 between its two extreme positions in one of which the opening 90 is in registration with the optical axis of the lens 78 and in the other of which the opening 110 is in registration with the optical axis of the lens 104, the user can set up the apparatus either to measure the shavability of the blade 30, or to calibrate the three scanning beams.

Referring now in detail to the specific structure of the apparatus, the reference numeral 112 (FIG. 1) denotes the entire instrument. Said instrument includes a base 114 and a casing 116 of suitable proportions to contain the various parts of the apparatus. More particularly, the casing is divided by a vertical partition 118 into a front section and a back section. The back section is subdivided by a horizontal panel 120 into an upper compartment 122 where the principal electrical components shown in FIG. 19 are housed and a lower beam projecting compartment 124. The front section is subdivided by a horizontal panel 126 into an upper light measuring compartment 128 and a lower blade scanning compartment 130.

The mountings for each of the bulbs 58, 60, 62 are identical, and hence the mounting for only one of them, the bulb 58, will be described in detail. Referring to FIGS. 4 and 15, it will be seen that the bulb 58 has its shank 132 engaged in a conventional electric light socket 134. Said socket has an out-turned annular base flange 136 that is located and slidable within a cylindrical tube 138 having a base cap 140. Extending forwardly toward the bulb from the base cap are three long cylindrical bolts 142 (see also FIG. 16) having threaded shanks that are screwed into tapped openings 144 in the flange 136. Long helical springs 146 encircle the shanks of the bolts and are held under compression between the flange 136 and base cap 140. The heads of the bolts are received in recesses in the outer face of the cap. Thus by turning the bolts 142, the filament of the bulb 58 can be arranged for disposal in a plane perpendicular to the optical axis of the lens triplet 66.

The tube 138 is snugly slidably and rotatably received in a horizontal cylindrical bore 148 formed in a sleeve 150 that extends through an opening in the back wall of the casing 116 and is secured thereto, as by a set screw 152. The sleeve 150 for the bulb 58 is perpendicular to the back wall of the casing. However, the sleeves for the side bulbs 60, 62 are at an angle of 30° to said back wall and to the sleeve for the bulb 58. The longitudinal axes of all of said sleeves lie in a common horizontal plane. Said sleeves are provided with ventilation slots 154. The tubes 138 are held in set position in the sleeves 150 by knurled-head, manually manipulatable set screws 156.

To properly orient the filament of each of the bulbs in space after said filaments are arranged to lie perpendicular to the respective optical axes of the lens triplets 66, the set screws 156 are loosened and, by manual manipulation of the knurled caps 140, the filaments are arranged to lie in a common horizontal plane and to be focused on their respective slits 72. To expedite the aforesaid focusing action, peepholes 158 (FIG. 6) are provided in the rear wall of the casing alongside each of the sleeves 150. When a machine is initially set up or when a bulb is replaced, the operator moves the proper tube 138 until he sees the image of the associated filament focused on the corresponding slit and extending longitudinally thereof.

A tubular holder 160 is received in each sleeve 150 directly in front of and in alignment with the tube 138 whereby it encloses the bulb 58. The lens triplet 66 is firmly mounted, as by collars 162, at the forward end of the holder.

Referring to FIG. 4 it will be observed that the plates 70, 72 which define the slit 68 are carried by a mounting plug 164 fixed in the rear end of a protective tubing 166. The plug is apertured and the plates 70, 72 are located on the front of the plug and form the slit 68 extending horizontally across the aperture in the plug. The back of the plug has a transparent dust cover 168 secured thereto.

The beam splitter 76 is supported by a mounting sleeve 170 located in the tubing 166 a short distance forwardly of the plates 70, 72, the rear end of said sleeve being bevelled so that the beam splitter is at an angle of 45° to the optical axis of the lens triplet 66. A pair of plates 172 extend across the front of the sleeve 170 forming between them a horizontal slot barely large enough and so located as to pass the bundle of light rays projected by the lens triplet through the slit 68.

The lens 74 is seated in a mounting member 174 fitted into the forward end of the tubing 166. The forward tip of said tubing 166 projects through an opening in a panel 176 at the front of the beam projecting compartment 124 and extends into an opening 178 in the vertical partition 118. This latter opening is protected by a transparent dust cover 180. The protective tubing 166, as well as the components supported thereby, and the mounting for the bulb, are so located as to focus a beam of light on the edge of the razor blade 30 located in the blade scanning compartment 130.

The lens triplet 66 is so optically designed that the image 182 of the coiled filament 64 of the bulb formed in the plane of the slit 68 (see FIG. 14) is of such size that the diameter of the coil is greater than the width of the slit. Moreover, the slit is so located that the long edges of the coil image fall on the two opaque plates 70, 72 and only the central core of the coil image is disposed in the slit 68. Preferably the disposition of the slit is such that the longitudinal center line of the coil image is substantially coincident with the longitudinal axis of the slit whereby the portion of the coil image located in the slit is symmetrically disposed therein.

Due to the foregoing arrangement the portion of the coil image which is at the object plane of the lens 74 constitutes two oppositely curved series of parallel incandescent arcs of substantially uniform light intensity. The incandescent bends of the coils joining the aforesaid arcs are occluded from the object plane of the lens 74 because the projected light energy of these bends is not of uniform field intensity. Accordingly, the image formed at the focal plane of the lens 74, and which is disposed along the edge of the blade 30 being measured, is substantially uniform in a vertical plane. Therefore, should the blade be shifted up or down within the confines of the scanning beam, there will be no noticeable change in the light energy impinging on the edge of the blade, so that the specific location of the blade edge is not critical as it would be if the blade edge were moved into and out of a portion of the field of the beam containing an image of the incandescent bends of the coil filament.

One or more blades 30 are positioned in the blade scanning compartment 130 by a blade holder 184 of simple construction constituting a pair of rigid metal bars 186, 188 that are held together, as by screws 190. A groove 192 formed along the upper edge of one of the bars faces the other bar so that the bars jointly define a long linear upwardly facing slot, the cross-section of which is such as snugly to receive the back dull edge of the razor blade 30.

It will be understood, of course, that holders having differently shaped slots are provided to receive and securely hold blades having differently shaped back edges and different widths so that the holders, regardless of the shape or dimensions of any given blade, will locate the edge of the blade at the intersection of the focal plane of the lens 74 and the object plane of the lens 78.

One of the bars is slightly shorter than the other and to the protruding portion of the longer bar there is fixed a handle 194 that facilitates manipulation of the holder. The outer face of the lower portion of each bar is formed with a broad squat rib 196 which functions in a manner later to be described for accurately locating the holder and, accordingly the blade or blades carried thereby, in the scanning compartment.

Means is provided within the blade scanning compartment for slidably engaging the blade holder 184 and guiding it in a path of travel such that the edge of the blade will coincide with the intersection of the focal plane of the lens 74 and object plane of the lens 78. Said means preferably is such as to permit vertical adjustment of the path of travel of blades, whereby to compensate for different widths of blades and thus avoid the necessity of providing a different blade holder for every width of blade.

The adjusting means is best illustrated in FIGS. 4–9 from which it will be seen that it includes a track 198 having a lower wall 200 on which the bottom of the blade holder is adapted to slide. Said track further includes an upwardly extending wall 202 against which the back rib 196 of the blade holder slides. An overhanging ledge 204 at the top inside corner of the wall 202 slidably engages the upper edge of said back rib. Thus the track constrains the holder against upward, downward or rearward movement, although it permits longitudinal slidable movement.

The track is secured at its opposite ends to plates 205, the front surfaces of which are slidable against the rear walls of brackets 206 (see FIG. 9) that are mounted on the base 114 of the apparatus. Each bracket includes at one vertical edge a rearwardly extending wall 208 (see FIG. 9) integral with an inwardly turned flange 210 that slidably engages the rear surface of the plate 205. Thus the wail 206 engages the front surface of the plate, the wall 208 one edge surface, and the flange 210 the rear surface. In addition, another wall 212 extends rearwardly from the opposite vertical edge of the wall 206 to engage the other edge of the plate, and said wall 212 likewise has an inturned flange 214 which engages the rear surface of the plate whereby the plate is constrained for slidable movement in a substantially vertical direction.

Actually this direction is not exactly vertical but is inclined rearwardly at an angle such that, as mentioned heretofore, light from the beam 38 will be reflected off the flank 36 in a direction having a downward component and, therefore, away from the optical measuring system. The wall 200 is tilted down and the wall 202 tilted rearwardly at the same angle.

Also attached to the plate 205 is a rearwardly projecting block 216. A pressure bar 218 is located between the top surface of the lower wall 200 and the under surface of the block 216, these two surfaces being parallel and spaced apart a proper distance to slidably accommodate the pressure bar for movement toward and away from the wall 202 (see FIG. 7).

A compression spring 220 (see FIG. 9) is interposed between the plate 205 and the pressure bar whereby to bias said bar toward the wall 202. The ends of the spring are anchored against side slip, as by seating in wells in the plate and pressure bar. The pressure bar is anchored to the plate in such fashion as to permit shifting toward and away from the wall 202, this attachment being effected by a screw 222 having a tapped shank engaging the pressure bar and a head slidable in a well 224 in the front face of said plate 205. Thus, the pressure bar will move up and down with the plate but can shift rearwardly or forwardly with respect thereto.

The block 216 is dimensioned and arranged to slidably engage the upper edge of the front rib 196 of the blade holder (see FIG. 7), thereby preventing tilting of the holder and aiding the ledge 204 in preventing upward movement of said holder. The spring 220 and pressure bar 218 are so dimensioned that a pressure is exerted on the blade holder sufficient to frictionally bind the same in any selected position along the track 198.

As will be seen in FIG. 9, the end inner corners of the pressure bar, of the wall 202 and of the ledge 204, are chamfered as at 226 to facilitate insertion of the blade holder in the track.

The side wall 228 of the casing includes an opening 230 through which the blade holder is inserted into the scanning compartment 130 and through which the handle 194 extends for manipulation of the holder. Thereby, if more than one blade at a time is carried by the holder, after examination of any given blade is completed, the holder merely is shifted longitudinally of the track until the next blade is in position for examination.

To vertically translate each plate 205, we include means which comprises a rack gear 232 suitably secured, as by pins 234 (see FIG. 8) to one vertical edge of the plate. The rack gear meshes with a pinion 236 fixed to a shaft 238 (see FIG. 7) that is journalled in a bearing 240 carried by the bracket 206. The pinion bears against the lower end of the bearing, and a collar 242 fast on the shaft bears against the upper end of the bearing, whereby the axial position of the pinion is maintained. The shaft 238 extends through an opening 244 in the front wall of the casing to receive a knob 246.

It will be appreciated that by rotating the handle at either end of the track the corresponding end of the track will be raised or lowered. In this manner, we are able to adjust the track to accommodate like blades of various widths without using a different holder. The slight amount of play between the edges of the plate 205 and the walls 208, 212, which constitute the gibs for said edges, as well as the considerable length of the track, enable either end of the track to be moved up or down without binding by rotation of the shafts 238.

It is desirable to maintain the track in fixed position for sustained periods of operation and, since the friction of the shafts 238 in the bearings 240 will not suffice for this purpose, we have provided a clamping means selectively to lock the plates in any adjusted position. Said clamping means includes an L-shaped dog 248 having a lip 250 located immediately in back of the plate 205. The shank of the dog is tapped to receive the threaded end 252 of a shaft 254 journalled in a bearing 256 that is carried by the bracket 206. The front end of the shaft protrudes through the opening 244 and carries a knob 258.

It will be obvious that when the shaft 254 is turned in one direction it will draw the lip 250 tightly against the back of the plate 205 and cause the latter to frictionally bind against the front wall of the bracket 206. Conversely, turning the shaft 254 in the other direction will release the plate for free movement in a generally vertical direction under control of the adjusting shaft 238.

As mentioned earlier, the light from the perpendicular and side beams which is reflected upwardly by the cutting edge of the blade is collected by the lens 78. Referring to FIGS. 4, 10 and 11, said lens is located in approximately the plane of the partition 126 and its vertical optical axis intersects the point of convergence of the optical axes of the lenses 74. For mounting purposes, the lens 78 is carried in a downwardly extending open-ended barrel 260 secured to the underside of the partition 126. Said partition is apertured, as at 262, in line with the lens.

The angular shutter 91 is of W-shaped cross-section (see FIG. 11) and has one horizontal leg 264 overlying the aperture 262. It is this leg which has formed therein the opening 90 that is adapted to be aligned with the lens 78. The shutter is secured to a long horizontal rod 266 (see FIG. 13) which is employed to shift the shutter between measuring and calibrating positions. A tension spring 268 has one end anchored to the rod 266 and the other end anchored to the side wall 269 of the casing.

To shift the shutter from its idle position in which it is set for measuring and in which the opening 90 is in alignment with the lens 78, we employ a solenoid 270 connected to the rod 266 by a link 272. Upon energization of the solenoid the rod and shutter are drawn toward the left as viewed in FIG. 5. In this actuated position, the opening 90 is out of alignment with the lens 78 and the opening 110 is in alignment with the lens 104. As soon as the solenoid is deenergized the shutter will resume its idle measuring position.

The drum 80 is located above the lens 78, being fixed to a shaft 274 that passes through an opening (see FIG. 11) in a partition 276 and is coupled to the drive shaft of an electric motor 278. The periphery of the drum is formed with the slots 82 which extend parallel to the axis of rotation of the drum and are uniformly spaced apart around the drum's circumference. The axis of rotation of the shaft 274 is so located that the optical axis of the lens 78 extends through the path of travel of the slots 82 (see FIG. 11), whereby any light directed upwardly by the lens 78 will be intermittently intercepted by the opaque fingers of the drum between the slots.

It has been pointed out above that the quantity of light collected by the lens 78 and directed into the measuring system is minute, and the resulting electric signal must be considerably amplified to obtain a usable level. The light emanating from the incandescent filaments is steady and therefore the energy collected by the lens 78 does not fluctuate. Accordingly, if no other provision were made, it would be necessary to utilize a D.C. amplifier for the output of the photo electric cell. Such amplifiers are not particularly reliable nor do they provide a good linear amplification, such as is needed in a trustworthy measuring instrument. However, by intermittently intercepting the light beam emanating from the lens 78, we chop this beam into fragments which form pulses of energy in the photo electric cell. This in turn generates an A.C. voltage at the cell output which can be amplified by a standard A.C. linear amplifier.

The light collected by the lens 78 is directed upwardly through the circumference of the drum to the beam splitter 86 which, as best can be seen in FIG. 10, is mounted in a casting 280 supported from angle irons 282 running across the top of the light measuring compartment 128. The casting is formed with a vertical passageway 284 leading from the beam splitter to the prism 88 located thereabove and likewise mounted in the casting 280. Light entering the prism from below is reflected parallel to the axis of rotation of the drum through a horizontal passageway 286 in the casting 280 to the lens 84 that is secured in a chamber 288 in the casting. Said chamber leads from the lens 84 to the photo electric multiplier 48.

It will be appreciated that the total energy reflected upwardly from the tiny width of the cutting edge of the blade is very small, and hence the amplification that must be effected by the photo electric multiplier and its amplifying stages is great. Any local stray light, therefore, will lower the sensitivity or falsify the reading inasmuch as it will be amplified along with the signal. To this end, the structure of the apparatus is such that stray light which would affect the measurement is almost entirely eliminated. Several different features of the apparatus cooperate for this purpose.

The entire inside of the blade scanning compartment 130 is rendered substantially non-reflecting as by applying to all surfaces thereof, except surfaces in sliding contact with one another, a dark, preferably black, matte finish.

There are two sources of stray light within the compartment 130. These are the bright spots formed on the walls of the compartment by the portions 40, 42 (see FIG. 3) of each scanning beam which override the cutting edge or are reflected by the flank 36 of the razor. We have ascertained that the amount of stray light present at the scanning zone (that portion of the razor edge struck by the three scanning beams) is an exponential function of the distance from the scanning zone to the interior surfaces of the casing on which said beam portions impinge. We further have ascertained that the principal source of stray light in the scanning zone is the group of bright spots formed by the beam portion 40 which pass unimpededly to the back of the front wall of the casing. These spots have an energy content extremely high in contrast to that being measured. On the other hand it appears that the beam portions 42 are dispersed to such an extent by reflection from the flank 36, that they do not form spots on the casing wall of an intensity of the same order as that created by the beam portions 40. Although the matte interior finish of the casing satisfactorily squelches secondary radiation, the primary radiation from the spots, and particularly from the spots formed by the beam portions 40, is so great that noticeable stray light returns to the scanning zone where, unless care is observed, it may match or even override the signal to be measured. Although the stray light is a constant for any given blade location and compensation therefor can be made, as by resetting the meter, we have found that by providing a distance from the focal plane of the lens 74 to the front wall of the casing of at least five inches, the amount of stray light in the scanning zone is small enough to prevent masking of the edge light signal.

In addition to these structural arrangements, we employ an optical arrangement which is particularly efficient in negating stray light. This constitutes the use of the focusing lens 78 with its focal plane at the focal plane of the razor blade. Indiscriminately directed light rays, even though traversing the scanning zone, e.g., rays passing horizontally across said zone, will not be collected by the lens 78 and hence will not enter the measuring system. Therefore, the only energy that will be observed by the optical measuring system is that of those rays of light which come within the field of acceptance of the lens 78. We have observed that the exclusion of stray light achieved by this optical arrangement is so excellent that, even when the apparatus is set for maximum sensitivity, a condition which will be described hereinafter, shining a beam of light from a flashlight in the blade scanning compartment will cause only an almost unnoticeable change in the reading obtained.

The total effect of all three of these arrangements, i.e., the non-reflecting matte surface, the remote location of the front wall of the casing and the optical measuring system using the focusing lens 78, is such that the magnified signal shows substantially no background error.

It is highly desirable to visually inspect the edge to be measured both for the purpose of ascertaining whether the scanning beams are properly striking the same and for the purpose of conducting a gross examination of the sharp edge. To this end we include in the apparatus a viewing tube 292 (see FIG. 5) having its upper end located on a horizontal ledge 294 at the front of the casing. The viewing tube extends downwardly and rearwardly (see FIG. 4) toward the bottom of the light measuring compartment 128. Said viewing tube terminates at an interception tube 296 (see FIG. 5) which is horizontally disposed within the light measuring compartment and has a plugged end 298 protruding from the side of the casing (see FIG. 1). The interception tube is axially shiftable and the end 298 is knurled to facilitate such movement of the tube.

An opening 300 is formed at the top of the tube directly above a reflecting mirror 302. Said opening and mirror are so disposed that when the interception tube is in idle position, this being to the extreme right, as viewed in FIGS. 5 and 10, the opening 300 is out of alignment with the viewing tube 292, hence anyone looking down the tube will see nothing but darkness. However, when the interception tube is shifted to its extreme left-hand position, the opening 300 is lined up with the viewing tube, and the longitudinal axis of the tube is at the center of the reflecting mirror 302. The left-hand end of the tube (see FIG. 10) is slidably received in a cylindrical bore of a guide block 304 (see FIGS. 10 and 11) and has secured to it a reflecting prism 306 which enables the tube to view the region vertically beneath the prism. When the interception tube is in the extreme left-hand position the prism 306 is directly above the lens 78. Thus in this position the viewer is able to visually inspect the sharp edge of the razor blade, if the same is properly illuminated.

It is desirable, when setting up the apparatus, to shift the inspection tube to viewing position and while the three bulbs are energized to unclamp the track 198 and shift the ends thereof until light strikes the edge of a blade located in the holder and ready for inspection. The operator readily can see when the blade is in correct position, inasmuch as at such time a bright line of light will appear in the field of view. The operator does not have to delicately adjust the position of the blade edge to secure any particular portion of the beam for measuring purposes since, as has been pointed out hereinabove, the entire field is of substantially uniform areal intensity.

To insure that the prism is maintained in correct spatial orientation, means is included to limit movement of the interception tube to axial shifting only. Such means includes a pin 308 carried by the guide block 304 and slidably received in a slot 310 in the tube that is elongated parallel to the longitudinal axis of said tube.

It will be seen that the guide block 304 overlies the opening 262 inasmuch as it supports the left-hand end of the interception tube. To enable light passing through the lens 78 to strike the drum, said block includes a vertical passageway 312 (see FIG. 10) in alignment with the optical axis of the lens 78 and capped by a transparent dust cover 314.

The structural arrangement of the various elements of the calibration section 92 is best shown in FIGS. 4, 6, and 11. As has been noted above, the beam splitter 76 which draws off some of the energy passing through each of the slits 68 is located in the protective tubing 166. Such tubing is fashioned with an opening 316 directly above the beam splitter to pass light reflected upwardly therefrom. This light is trained on the polarizing ring 100 which is mounted in a hollow vertical tube 318 that also supports the rear end of the protective tubing. The prism 98 is secured at the upper end of the tube 318 and directs light forwardly of the apparatus toward the lens 94.

As can be seen in FIG. 6 the two side prisms 98 are directed inwardly at an angle of 45° to the middle prism so that the optical axes of all three prisms and of the associated lenses 94 are trained upon a common region of the ceramic reference disc 96. Accordingly, the bundle of light rays defining the two outer slits 68 are rotated about the optical axes of the outer lenses 94 as they are reflected off the side prisms 98 and by these prisms directed centrally toward the optical axis of the middle lens 94. The bundle of light rays defining the central slit is not so affected. The undesirable rotation is corrected and horizontal positioning of the slit images secured by the beam-rotating Dove prisms 102 in both outer calibration paths.

The lens 94 and prism 102 of each calibration path are rotatably mounted in a horizontal tube 320, one end of each of which is carried by a cap 322 in which the prism 98 is secured. The caps are located on top of the associated vertical tubes 318. The forward end of each tube 320 is received in an opening in a casting 324 in which the reference surface 96 is located.

Each polarizing disc 100 is mounted in a sleeve 326 that is rotatable within the related tube 318. The sleeve is locked in an adjusted angular position as by a set screw 328, and to facilitate turning the sleeve a slot 330 is formed in the tube 318.

The casting 324 also carries the lens 104 (see FIG. 4), the horizontal optical axis of which is directed downwardly by the prism 106 onto the ceramic reference disc 96. The object plane of said lens is at the portions of said disc 96 where it is struck by the three convergent calibration beams. The lens 104 is secured in a mounting tube 332 (see FIGS. 4 and 11), the forward end of which extends through an opening 334 in the partition 118. The vertical leg 108 of the angular shutter 91 rides on the front face of said partition and normally blanks off the opening 334. However, said leg is provided with the opening 110 adapted to be registered with the opening 334. A block 336 cooperates with the partition 118 to guide the shutter 91. Said block includes an opening 338 in registry with the opening 334, said opening 338 being protected by a transparent dust cover 340.

The photo multiplier 48 is conventional and the output therefrom is amplified by standard means to drive a milliammeter 342 which for convenience of reading is mounted on the front wall of the casing. As shown in the circuit (see FIG. 19), the output terminal 344 of the photo multiplier is connected by a lead 346 to an inter range switch 348 through the operation of which the full potential of the photo multiplier is coupled to the control grid 350 of the first amplifier tube 352 when the switch arm 354 is in its uppermost position. In the middle position of the arm, 10% of the output of the photo multiplier is coupled to the control grid and in the lower position of the arm, only 1% of the photo multiplier output is coupled to the control grid. The output from the first amplifier tube is fed through a gain control 356 to four cascaded amplifying stages 358, 360, 362, 364, the first three of which are provided with suitable filters 366 to ground out power frequency and its first harmonic and peak the frequency of pulsation created by the notches 82 interrupting the light collected by the lens 78. In addition a feedback is included in the second cascade stage 360 to prevent ringing. The last stage 364 is employed for impedance matching to the milliammeter.

The circuit also includes a potentiometer 361, a section of which is shunted across the milliammeter in order to set the zero reading of the milliammeter.

The power supply means for the circuit is standard. However, it will be noted that a voltage regulator 363 is employed to minimize the effect of fluctuations in the line.

Power is fed to the circuit at a plug 365 through a main switch 369. A switch 368 controls power to the solenoid 270 and a switch 370 controls power to the chopper motor 278.

Each of the bulbs 58, 60 and 62 is controlled by its own switch 372, 374, 376 respectively. Moreover, the voltage source for each of the bulbs is maintained at a set level by a voltage regulator 378, one such voltage regulator being provided for each bulb in order that the voltage regulators may be run underrated and a close degree of control effected. The voltage regulators 378 feed their respective bulbs through variable auto transformers 380 so that the intensity of illumination of each of the bulbs can be controlled individually. To use the apparatus the track must be set and the bulbs adjusted and calibrated.

In preparing the first of a series of apparatuses for use, the operator is supplied with a group of ordinary average acceptable razor blades which are a typical sampling of one or more factory runs. These razor blades are from lots which have been tested by present-day known methods. For example, the razor blades are representative of lots which have been run through various shaving, cutting and life tests and have been found acceptable, and which have been examined visually and microscopically for gross and minute defects.

One of these typical blades is placed in the holder 184 and the holder slid into the track 198. The switches 369, 372, 374, 376 are closed to energize the three bulbs 58, 60, 62 which thereupon cast beams of light that converse in a zone in the blade scanning compartment. At this time none of the auto transformers 380 has been set nor has the track been adjusted. It is necessary first, therefore, to vary the position of the track in order to properly orient the sharp edge of the razor blade to be measured. To this end, the interception tube 296 is pushed inwardly, causing the opening 300 and the reflecting mirror 302 to be lined up with the viewing tube 292 and the reflecting prism 306 to be disposed on the optical axis of the lens 78. The operator looking through the viewing tube now can see that portion of space where the three beams converge. However, since the zone of convergence is in a jet black box which contains substantially no floating dust particles, it will not be visible.

The operator, while continuing to look through the viewing tube, pushes the blade holder into a position in front of the tubes 166, this being empirical in the first instance. Then the operator loosens both clamp knobs 258 and adjusts the positions of the opposite ends of the track by manipulating the height adjusting knobs 246 until the edge of the razor blade is in the zone of convergence of the scanning beams. This is evident to the operator as a bright line against a black field, the bright line being the flank 36 of the razor blade which is lit up by the three beams. The operator adjusts the track approximately midway between the two positions in which the illumination on the edge of the razor blade is extinguished, thus ensuring that the edge of the blade is out of the penumbral areas of the beams and making certain that said edge lies in the light field of full intensity. It will be remembered that said field is of substantially uniform light intensity so that the specific location of the blade edge therein is of no importance.

The operator now draws the interception tube outwardly to its idle position, thereby bringing the optical measuring system into play. At this time there will be no reading on the milliammeter 342 inasmuch as the beams of light reflected from the razor blade edge and ultimately reaching the photo multiplier do not fluctuate in intensity and therefore the electrical output will not be amplified by the cascaded A.C. amplifier stages 352, 353, 360, 362, 364.

The inter range adjustment arm is turned to its lowest (least sensitive) position to make certain that too great a surge of power is not applied to the milliammeter. The gain control 356 is turned to a low setting for the same reason. The potentiometer is adjusted to secure a zero reading on the milliammeter.

Now the operator closes the switch to energize the chopper motor 278. Thereupon the arm 354 is turned to mid position and the gain control 356 readjusted so that a low reading is obtained on the milliammeter. Finally, the arm is thrown to its uppermost position of maximum sensitivity and the gain control adjusted to swing the milliammeter needle about one-quarter of the scale way from the zero mark.

With the chopper motor still running, the operator opens the switches 374, 376, leaving closed the switch 372 which controls the central bulb 58. The arm 354 is left in its uppermost position so that a full sensitivity reading is obtained. The auto transformer for the bulb 58 is regulated to secure a medium intensity of illumination from said bulb and the gain control manipulated to obtain some arbitrary reading on the milliammeter which preferably is approximately one-twentieth of the full range. For example, the gain control is set to obtain a reading of "3" on a scale reading up to "50."

Next the switch 372 is opened and the switch 374 closed so as to extinguish the central beam and energize one of the side beams. The auto transformer 380 for the bulb 60 now is manipulated to obtain an arbitrary reading on the milliammeter.

We have found in the testing of razor blades that particularly satisfactory results are secured where the milliammeter reading for side illumination by a single beam exceeds the reading obtained on the milliammeter for the central beam alone. In the preferred operation of our invention we select an adjustment for the auto transformer which is such that the milliammeter reading for the side beam is about double that for the center beam, although excellent results are achieved with the auto transformer adjustment such that the milliammeter reading for the side beam is anywhere from about equal to about four times the milliammeter reading for the central beam. Although we believe that at about the preferred ratio proper weight is given to the respective influences on shavability of the keenness of the edge and the irregularity of the edge, we have observed that even where the ratio is varied considerably, a good overall determination of shavability still is secured.

It will be apparent that if the keenness increases the milliammeter reading for the center beam alone will decrease and if the edge irregularities are less pronounced, the milliammeter reading for a side beam alone will decrease. An increase in one which is substantially balanced by a decrease in the other, remembering that two side beams are in operation during testing, results in the same order of shavability. This has been confirmed by a large number of tests.

The switch 374 next is opened and the switch 376 closed. The auto transformer for the last of the bulbs is manipulated to obtain the same reading on the milliammeter as was obtained for the bulb 60.

In the example given, if the bulb 58 actuates the photo multiplier to the extent that a reading of "3" on the milliammeter is secured and each of the side lights obtain a reading of "6," when all three lights are energized, a reading of "15" will be had for the sample blade. Optionally, the gain control can be manipuated with all the bulbs lit to select a milliammeter reading which is an integral number and thus is easy to recall.

The arbitrary reading "15" thus obtained constitutes the numerable criterion which is applied to all blades thereafter tested. That is to say, that if a succeeding blade tested in the apparatus secures a numeric reading greater than "15," the blade will be rejected.

It will be appreciated that the reading secured on the milliammeter actually is a totalized figure; that is to say, it represents keenness as measured by the central beam, irregularities picked up by one side lighting beam, and irregularities picked up by the other side lighting beam. We have found that if the keenness is lowered but the reading picked up by the side lighting beams is decreased, that is to say that the irregularities become less, the shavability of the blade is the same. It is for this reason that the single figure given by the milliammeter for the reflection of all three beams is sufficient to determine whether a blade is acceptable. It also will be appreciated that, conversely, if the quality of the blade diminishes, i.e., its irregularities are increased, and if the keenness is increased, the blade still may be acceptable, provided that the total figure is not greater than the total figure arbitrarily set in the foregoing manner.

We have obtained satisfactory results where different ratios of side to perpendicular lighting were employed. For instance, when we set the side lights to provide individual readings three and even four times that of the center light, we observed that when a blade exceeded a new totalized figure, its shavability was unacceptable by other present-day tests and this was so regardless of individual changes in keenness and quality, and when the figure was not exceeded the shavability was acceptable despite variations in keenness and quality. Hence, this totalized figure represents a true numerable measure of shavability.

Not only does this method obtain satisfactory test results with razor blades made by the same manufacturing steps, but it also obtains excellent comparative results for blades made by different manufacturing steps. For instance, the apparatus set up as described above has been found to secure excellent results when testing blades of different manufacturers made by different grinding, honing and stropping steps. The apparatus also has provide good comparisons between present-day and old blades. For instance, a present-day blade of only reasonably good keenness, but excellent smoothness and regularly of edge obtains the same milliammeter reading as an old blade of very good keenness and average smoothness and regularity of edge. When these different but acceptable blades are subjected to the other known tests their shavability was found to be about the same. Thus the apparatus is able to provide a numerable figure against which all manufacturers can compare the excellence of their edged tools.

Ordinarily it is desirable during normal use of the apparatus where a large number of razor blades or the like is being checked continually for production control, to place several blades in the holder at once, these blades having been picked at random or in accordance with some particular scheme from the output of one or more machines. Blade after blade is visually inspected and measured in the apparatus, one after the other. If any blade yields a milliammeter reading greater than the totalized permissible reading, appropriate corrective procedures are taken.

The apparatus also is used to check blade symmetry. Thus a measurement is taken on one side of a blade, i.e., with the scanning beams impinging on the flank 36, and thereafter the blade is turned around and a measurement taken with the scanning beams impinging on the opposite flank 34. We believe that such measurements are particularly desirable for proper production control. If the measurement taken on either flank exceeds the predetermined totalized figure, the blade is unacceptable and will be found to be so if checked by other tests.

It is important to note that the apparatus is able with equal facility to test all kinds of curved edges, as well as straight edges, and therefore can be utilized to measure the keenness and quality of blades, such as, for instance, surgical blades, many of which have appreciable curvatures and do not lend themselves readily to testing.

Once the initial settings of the auto transformers have been made, the apparatus is calibrated, such calibration being a permanent one and providing a standard against which the optical portion of the apparatus will actually be checked unless a new totalized reading is to be selected. Moreover, as will shortly be appreciated, the calibrations of the apparatus desirably are carried over for identical calibration of all other like apparatuses, so that these other apparatuses will provide readings that can be freely compared.

To calibrate the apparatus, the operator opens all the light switches, except that for one bulb. For example, he opens the light switches 374, 376 and leaves the light switch 372 closed. In addition, the switch 370 is closed to maintain the chopper motor energized. Then the operator closes the switch 368 which activates the solenoid 270 and pulls the shutter 91 to its calibration position wherein the opening 110 is in registration with the opening 334. This provides a clear passageway between the lens 104 and the beam splitter 86 and blocks the lens 78. The operator now rotates the polarizing disc 100 associated with the energized bulb until some arbitrary reading is obtained on the milliammeter, for example, "20." This is done without changing the energization of the bulb.

Thereafter, the switch 372 is opened and the switch 374 closed, the switches 368, 370 and 376 being left closed, whereby the bulb 60 is lit and the beam of light passing through its associated slit thrown on the reference disc 96 to be scanned by the lens 104 and measured by the photo multiplier and milliammeter. The associated polarizing disc 100 is turned until another arbitrary reading is obtained. Preferably, the second calibration reading is identical with the first and indeed, it is to enable these two readings to be the same that the polarizing discs are included. The use of the identical readings and the ability to select an easily remembered number for calibration make the apparatus particularly simple to calibrate.

The foregoing operation is repeated for the third bulb 62.

At suitable intervals the operator checks the calibration to make certain that the intensity of illumination of each of the beams of light has not materially altered.

It will be appreciated that should any optical parts of the apparatus be changed, the machine can be recalibrated readily to the same figures as the initial ones and measurement thereafter will proceed normally, since the same constant values for readings of the intensity of the three beams is maintained. Changes in the electrical measuring parts of the apparatus are compensated for by adjusting the gain control 356. This ability of the apparatus to maintain a constant totalized control reading makes it possible to calibrate plural apparatuses and have them all yield the same test results. Thus, if a second apparatus is to be calibrated, any acceptable blade is measured in the first apparatus; then the same blade is placed in the second apparatus and the auto transformers and gain control manipulated to give the same meter reading as in the first apparatus for each individual bulb; finally, the polarizing discs in the second apparatus are adjusted to yield the same arbitrary calibration readings as those for the first apparatus. Thus, despite any differences in optical and electrical parts, all of the apparatuses will give the same totalized reading for the same blade.

It thus will be seen that we have provided a method and apparatus which achieve the several objects of our invention and are well adapted to meet the conditions of practical use.

As various possible embodiments might be made of the above invention, and as various changes might be made in the embodiment above set forth, it is to be understood that all the parts and steps hereinabove described and shown in the accompanying drawings are to be interpreted as illustrative and not in a limiting sense.

Having thus described our invention, we claim as new and desire to secure by Letters Patent:

1. In an apparatus for determining the cutting ability of an edged metal tool, means for holding a tool in a certain position, means for casting plural beams of light on the edge of said tool, the longitudinal axes of said beams being disposed at an angle to one another and symmetrically at angles other than 90° with respect to the length of the edge of the tool, and light responsive means above the edge of the tool for measuring only the light reflected off said edge by said beams.

2. In an apparatus for determining the cutting ability of an edged metal tool, means for holding a tool in a certain position, means for casting plural beams of light on the edge of said tool, the longitudinal axes of said beams being disposed at an angle to one another and at angles other than 90° with respect to the length of the edge of the tool, means for casting a beam of light on said edge of the tool at substantially 90° with respect to the length of the edge, and light responsive means above the edge of the tool for measuring only the light reflected off said edge by all said beams.

3. In an apparatus for determining the cutting ability of an edged metal tool, means for holding a tool in a certain position, means for casting plural beams of light on the edge of said tool, and light responsive means above the edge of the tool for measuring only the light reflected off said edge by said beams, one of said beams being perpendicular to the edge and the other of said beams being at an angle to said first beam, the light reflected off said edge by said second beam being from one to four times the intensity of the light reflected off said edge by said first beam.

4. In an apparatus for determining the cutting ability of a straight cutting edge of a metal tool, means holding the tool in a certain position, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

5. In an apparatus for determining the cutting ability of a straight cutting edge of a metal tool, means holding the tool in a certain position, means for forming a beam of light with a cross-section elongated in a direction parallel to the cutting edge of the tool, means directing said beam on the cutting edge of said tool with the longitudinal axis of the beam at an angle substantially different from 90° with respect to the length of said cutting edge of the tool, and with the elongated cross-section of the beam lying along a linear portion of the cutting edge, and light responsive means directly above that portion of the cutting edge of the tool on which the beam of light is directed for measuring the light reflected off said cutting edge by said beam, said last-named means having a limited field of view which excludes light reflected by said beam off a perfect portion of said cutting edge.

6. In an apparatus for determining the cutting ability of a straight cutting edge of a metal tool, means holding the tool in a certain position, means casting on a common portion of the cutting edge of said tool plural beams of light the longitudinal axes of which are at angles substantially different from 90° with respect to the length of the cutting edge of the tool and on opposite sides of a perpendicular to said edge, and light responsive means directly above that portion of the cutting edge of the tool on which the beams of light are cast for measuring the light reflected off said cutting edge by said beams, said last-named means having a limited field of view which excludes light reflected by said beams off a perfect portion of said cutting edge.

7. In an apparatus for determining the cutting ability of a straight cutting edge of a metal tool, means holding the tool in a certain position, means casting on a common portion of the cutting edge of said tool plural beams of light the longitudinal axes of which are at angles substantially different from 90° with respect to the length of the cutting edge of the tool, both of said beams of light being elongated transversely to the longitudinal axes of the beams in a direction parallel to the cutting edge so that the beams are cast along a common linear portion of the cutting edge, and light responsive means directly above that portion of the cutting edge of the tool on which the beams of light are cast for measuring the light reflected off said cutting edge by said beams, said last-named means having a limited field of view which excludes light reflected by said beams off a perfect portion of said cutting edge.

8. In an apparatus for determining the cutting ability of a straight cutting edge of a metal tool, means holding the tool in a certain position, means casting on the cutting edge of said tool a beam of light the longitudinal axis of which is substantially 90° with respect to the length of the cutting edge of the tool, means casting on the cutting edge of the tool a beam of light the longitudinal axis of which is at an angle to the longitudinal axis of the first-named beam, and light responsive means directly above those portions of the cutting edge of the tool on which the beams of light are cast for measuring the light reflected off said cutting edge by said beams, said last-named means having a limited field of view which excludes light reflected by said beams off perfect portions of said cutting edge.

9. In an apparatus for determining the cutting ability of a straight cutting edge of a metal tool, means holding the tool in a certain position, means casting on the cutting edge of said tool a beam of light the longitudinal axis of which is at an angle substantially different from 90° with respect to the length of the cutting edge of the tool, light responsive means, and an optical system arranged to cast light on said light responsive means and having its object plane at said edge.

10. In an apparatus for determining the cutting ability of a straight cutting edge of a metal tool, a straight track for holding the tool in a certain position, means for adjusting the position of the track transversely of its length, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

11. In an apparatus for determining the cutting ability of a straight cutting edge of a metal tool, a straight track for holding the tool in a certain position, means independently adjusting the ends of the track in a direction transversely of the length of the track, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

12. In an apparatus for determining the cutting ability of a straight cutting edge of a metal tool, a tool holder, a straight track slidably receiving said tool holder, said track including a stationary elongated member, a second elongated member mounted for movement toward and away from said first member and means biasing said members toward one another, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

13. In an apparatus for determining the cutting ability of a straight cutting edge of a metal tool, a tool holder, a straight track slidably receiving said tool holder, means mounting said track for movement transversely of its length, means for clamping the track in any adjusted position thereof, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

14. In an apparatus for determining the cutting ability of a straight cutting edge of a metal tool, a tool holder, a straight track slidably received in said tool holder, means mounting the track for movement transversely of its length, a rack movable with the track, a pinion meshing with the rack for selectively adjusting the position of the track, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

15. In an apparatus for determining the cutting ability of a straight cutting edge of a metal tool, a tool holder, a straight track slidably received in said tool holder, means mounting the track for movement transversely of its length, a rack movable with the track, a pinion meshing with the rack for selectively adjusting the position of the track, means for clamping the track in any adjusted position, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

16. In an apparatus for determining the cutting ability of a straight cutting edge of a metal tool, a tool holder, a straight track including a pair of elongated members, means biasing said members towards one another, plates located at the opposite ends of one of said members and firmly secured thereto, a pair of mounting members including gibs slidably engaging the plates to guide the track for movement in a direction transverse of the length of the track, means for securing the track in any adjusted position, means casting on the cutting edge of said tool a beam of light the longitudinal axis of which is at an angle substantially different from 90° with respect to the length of the cutting edge of the tool, and light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge.

17. In a method for determining the cutting ability of a straight cutting edge of a metal tool: that improvement including the steps of casting on the cutting edge of said tool a beam of light with the longitudinal axis thereof directed at an angle substantially different from 90° with respect to the length of the cutting edge of the tool, and measuring the light reflected directly above that portion of the cutting edge of the tool upon which the beam of light is cast so as to exclude from such measurement light reflected by said beam off a perfect portion of said cutting edge.

18. In a method for determining the cutting ability of a straight cutting edge of a metal tool: that improvement including the steps of casting on the cutting edge of said tool a beam of light with the longitudinal axis thereof directed at an angle of substantially 90° with respect to the length of the cutting edge of the tool, casting on the cutting edge of said tool a beam of light with the longitudinal axis thereof directed at an angle to the longitudinal axis of the first-named beam, and measuring the light reflected directly above those portions of the cutting edge of the tool upon which the beams of light are cast so as to exclude from such measurement light reflected by said beams off perfect portions of said cutting edge.

19. In an apparatus for determining the cutting ability of a straight cutting edge of a metal tool, means holding the tool in a certain position, means casting on the cutting edge of said tool a beam of light the longitudinal axis of which is at an angle substantially different from 90° with respect to the length of the cutting edge of the tool, light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge, a calibration section including means for directing at least a portion of the energy of said beam in a path which avoids the cutting edge of the tool and strikes the same light responsive means, said calibration section further including means for varying the intensity of light passing therethrough, and said apparatus additionally including means for selectively preventing light from reaching the light responsive means either from the cutting edge of the tool or from the calibration section.

20. In an apparatus for determining the cutting ability of a straight cutting edge of a metal tool, means holding the tool in a certain position, means casting on the cutting edge of said tool a beam of light the longitudinal axis of which is at an angle substantially different from 90° with respect to the length of the cutting edge of the tool, light responsive means directly above that portion of the cutting edge of the tool on which the beam of light is cast for measuring the light reflected off said cutting edge by said beam, said last-named means having a limited field of view which excludes light reflected by said beam off a perfect portion of said cutting edge, a calibration section including means for directing at least a portion of the energy of said beam in a path which avoids the cutting edge of the tool and strikes the same light responsive means, said calibration section further including polarizing means for varying the intensity of light passing therethrough, and said apparatus additionally including means for selectively preventing light from reaching the light responsive means either from the cutting edge of the tool or from the calibration section.

References Cited in the file of this patent

UNITED STATES PATENTS 1,287,092 Persons _____ Dec. 10, 1918

(Other references on following page)

UNITED STATES PATENTS

| | | |
|---|---|---|
| 1,404,751 | Foster | Jan. 31, 1922 |
| 1,973,066 | Hauser et al. | Sept. 11, 1934 |
| 2,027,595 | Knobel | Jan. 14, 1936 |
| 2,173,681 | Dimmick | Sept. 19, 1939 |
| 2,185,010 | Young | Dec. 26, 1939 |
| 2,215,211 | Devol | Sept. 17, 1940 |
| 2,217,861 | Frost | Oct. 15, 1940 |
| 2,256,102 | Reason | Sept. 16, 1941 |
| 2,315,282 | Snow | Mar. 30, 1943 |
| 2,341,295 | Shobert | Feb. 8, 1944 |
| 2,395,482 | Hurley | Feb. 26, 1946 |
| 2,446,628 | Brown | Aug. 10, 1948 |
| 2,502,503 | Berkley | Apr. 4, 1950 |
| 2,528,923 | Vassy | Nov. 7, 1950 |
| 2,651,969 | Thor | Sept. 15, 1953 |
| 2,709,874 | Delafontaine | June 7, 1955 |